United States Patent [19]

Iwatsuki

[11] Patent Number: 4,771,657

[45] Date of Patent: Sep. 20, 1988

[54] APPARATUS FOR CONTROLLING A BRAKE MEANS OF A VEHICLE

[75] Inventor: Kunihiro Iwatsuki, Toyota, Japan

[73] Assignee: Toyota Jidosha Kabushiki Kaisha, Aichi, Japan

[21] Appl. No.: 72,172

[22] Filed: Jul. 9, 1987

[30] Foreign Application Priority Data

Aug. 1, 1986 [JP] Japan ................................ 61-182564

[51] Int. Cl.$^4$ ............................................. B60K 41/18
[52] U.S. Cl. .................................. 74/866; 364/424.1; 192/0.09
[58] Field of Search ....................... 74/866; 364/424.1; 192/0.09

[56] References Cited

U.S. PATENT DOCUMENTS

| | | | |
|---|---|---|---|
| 4,262,783 | 4/1981 | Scarrott et al. | 74/866 X |
| 4,373,619 | 2/1983 | Schritt et al. | 192/0.09 |
| 4,518,067 | 5/1985 | Jow et al. | 192/0.09 |

Primary Examiner—Dirk Wright
Attorney, Agent, or Firm—Parkhurst & Oliff

[57] ABSTRACT

An apparatus controls braking force during changes in drive position of an automatic transmission. The apparatus includes a first sensor, a second sensor, a controller and a brake device. The first sensor detects manual operation of the automatic transmission and outputs a first signal during the manual operation of the automatic transmission. The second sensor detects engine load and outputs a second signal. The controller receives the first and second signals, and outputs a controlling signal during the manual operation of the automatic transmission and a condition that the engine load is less than a predetermined value. The brake device receives the controlling signal and is actuated to generate braking force in accordance with receipt of the controlling signal. Accordingly, when the automatic transmission is manually operated and the engine load is less than the predetermined value, the vehicle is braked.

20 Claims, 11 Drawing Sheets

Fig. 6

| SHIFT RANGE | | SOLENOID VALVE | | | CLUTCH | | | BRAKE | | | |
|---|---|---|---|---|---|---|---|---|---|---|---|
| POSITION | | 911 | 912 | 913 | C₁ | C₂ | C₀ | B₁ | B₂ | B₃ | B₀ |
| P | | ○ | × | × | × | × | ○ | × | × | × | × |
| R | | ○ | × | × | × | ○ | ○ | × | × | ○ | × |
| N | | ○ | × | × | × | × | ○ | × | × | × | × |
| D | 1st | ○ | × | × | ○ | × | ○ | × | × | × | × |
| | 2nd | ○ | ○ | ◎ | ○ | × | ○ | × | ○ | × | × |
| | 3rd | × | ○ | ◎ | ○ | ○ | ○ | × | ○ | × | × |
| | 4th | × | × | ◎ | ○ | ○ | × | × | ○ | × | ○ |
| 2 | 1st | ○ | × | × | ○ | × | ○ | × | × | × | × |
| | 2nd | ○ | ○ | × | ○ | × | ○ | ○ | ○ | × | × |
| L | 1st | ○ | × | × | ○ | × | ○ | × | × | ○ | × |
| | 2nd | ○ | ○ | × | ○ | × | ○ | ○ | ○ | × | × |

| NOTE | |
|---|---|
| ○ | ON ENGAGEMENT |
| × | OFF DISENGAGEMENT NONE |
| ◎ | L/C ON |

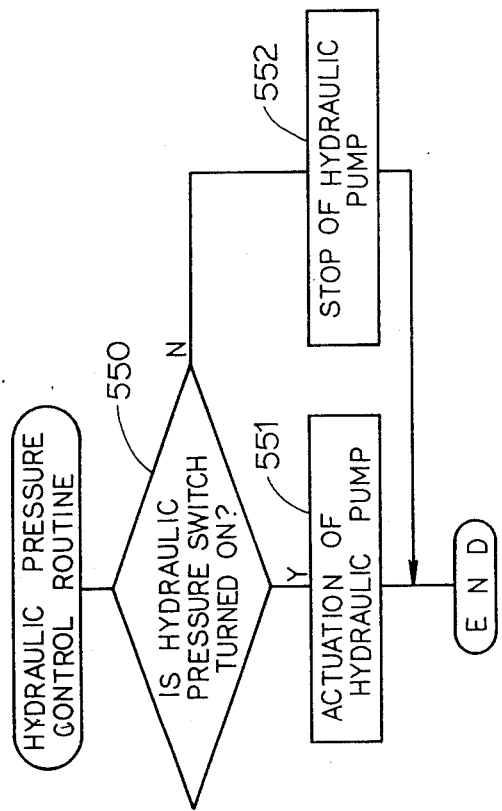

APPARATUS FOR CONTROLLING A BRAKE MEANS OF A VEHICLE

BACKGROUND OF THE INVENTION

The present invention relates to an apparatus for controlling a brake means of a vehicle which includes an automatic transmission, a shift lever, an engine and a brake means.

More particularly, the present invention relates to the apparatus for controlling the brake means when the automatic transmission is manually operated.

A conventional hydraulic control type automatic transmission includes brakes, clutches and epicycle reduction gears. When the conventional automatic transmission converts drive position, the brakes and the clutches are selectively engaged or disengaged, as a result, the gear ratios of the epicycle reduction gears are changed.

When a fourth drive position of a drive range "D" is converted into a second drive position of a second range "2", as shown in FIGS. 1-A and 1-B, the brake, frictioning as an engagement elements, is actuated.

The hydraulic pressure of the brake "Bo" is reduced at time "Ta" when converting from the fourth drive position of the drive range "D" into the second drive position of the second range "2" as indicated, and the hydraulic pressure of the clutch "Co" is increased to achieve a temporary third drive position.

Next, in the temporary third drive position, the hydraulic pressure of the clutch "C2" is reduced at time "Td", and hydraulic pressure of the brake "B1" is increased to achieve a second drive position of the second range "2" (i.e., in the condition of the converting of drive position, first of all, the brake "Bo" is disengaged and the clutch "Co" is engaged. Next, the clutch "C2" is disengaged and the brake "B1" is engaged.)

However, when the conventional automatic transmission is operated manually to obtain an engine brake function, there are various problems caused by the conventional automatic transmission during the converting of drive position (i.e., there are neutral conditions during time periods defined between "Tb" and "Tc", and between "Te" and "Tf"). In the neutral conditions, as shown in FIG. 1-A, output shaft torque of the automatic transmission becomes almost zero. The neutral condition is a result of the piston strokes of the clutch and the brake. In order to shorten the neutral condition, the piston stroke of the brake was shortened. However, if the piston stroke of the brake were too short, the brake would function always in normal driving condition.

On the other hand, when the fourth drive position of the drive range "D" is converted into the second drive position of the second range "2", first of all, the fourth drive position of the drive range "D" is converted into the temporal third drive position (i.e., a third drive position converting), and then the temporal third drive position is converted into the second drive position of the second range "2" (i.e., a second drive position converting).

Thus, in order to prevent the second drive position from converting simultaneously during the third drive position converting, it is designed that the second drive position converting starts later than the third drive position converting.

Accordingly, as described above, the conventional automatic transmission has problems (e.g., there is a neutral condition during time periods defined between start of the converting of drive position and start of engagement of the brake).

As a result, if the shift lever of the conventional automatic transmission were manually operated to obtain the engine brake function (e.g., when the vehicle drives down a steep hill) the vehicle would be accelerated. In other words, when an operator operates the conventional automatic transmission to obtain the engine brake function, the vehicle is accelerated regardless of the intention of the operator because of the neutral conditions of the conventional automatic transmission.

SUMMARY OF THE INVENTION

The present invention was developed in view of the foregoing background and to overcome the foregoing drawbacks. It is accordingly an object of this invention to provide an apparatus for controlling a brake means of a vehicle when an automatic transmission is manually operated.

To achieve improved on drivability during manual operation of the automatic transmission an apparatus according to the present invention controls the braking force of the brake means during the converting or changing of drive position of an automatic transmission. The apparatus is mounted on a vehicle and includes a first detecting means, a second detecting means, a controlling means and a brake means of a vehicle.

The first detecting means detects manual operation of the automatic transmission and outputs a first signal during the manual operation of the automatic transmission. The second detecting means detects engine load and outputs a second signal. The controlling means receives the first and second signals, and outputs a controlling signal during the manual operation of the automatic transmission when the engine load is less than a predetermined value. The brake means receives the controlling signal and is actuated to generate the braking force in accordance with receipt of the controlling signal.

Accordingly, when the automatic transmission is manually operated and the engine load is less than the predetermined value, the vehicle is braked by the brake means.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements:

FIG. 1-B is a timing chart of automatic transmission hydraulic pressure of the conventional automatic transmission;

FIG. 6 is a table showing the relationship between shift range positions, solenoid valves, clutches and brakes of the automatic transmission;

FIG. 7-B is a timing chart of showing automatic transmission output shaft torque and braking force of the present invention;

FIG. 7-C is a timing chart of actuating force of a foot brake according to the present invention;

FIG. 7-D is a timing chart of automatic transmission hydraulic pressure according to the present invention;

FIG. 11 is a flow chart showing a routine for controlling hydraulic pressure of the apparatus according to the present invention.

DETAILED DESCRIPTION OF THE PREFERRED EMBODIMENTS

The present invention will be described in detail with reference to the accompanying drawings which illustrate preferred embodiments according to the present invention.

Figure 1:
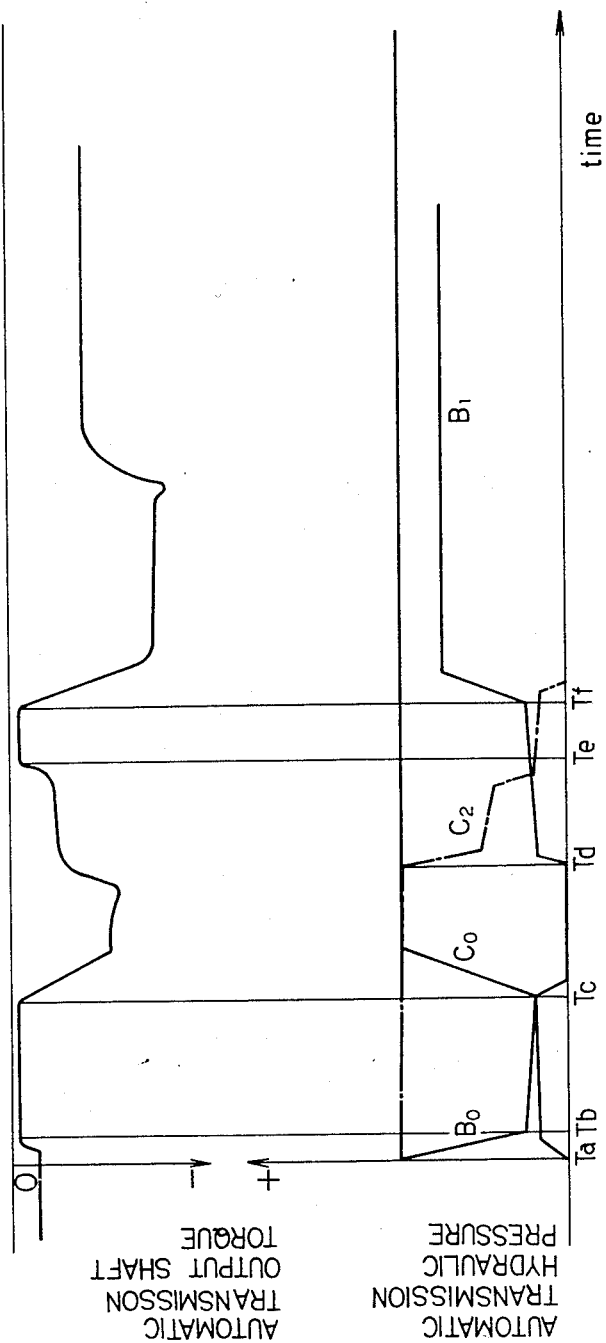
FIG. 1-A is a timing chart of automatic transmission output shaft torque of a conventional automatic transmission.
Figure 2:
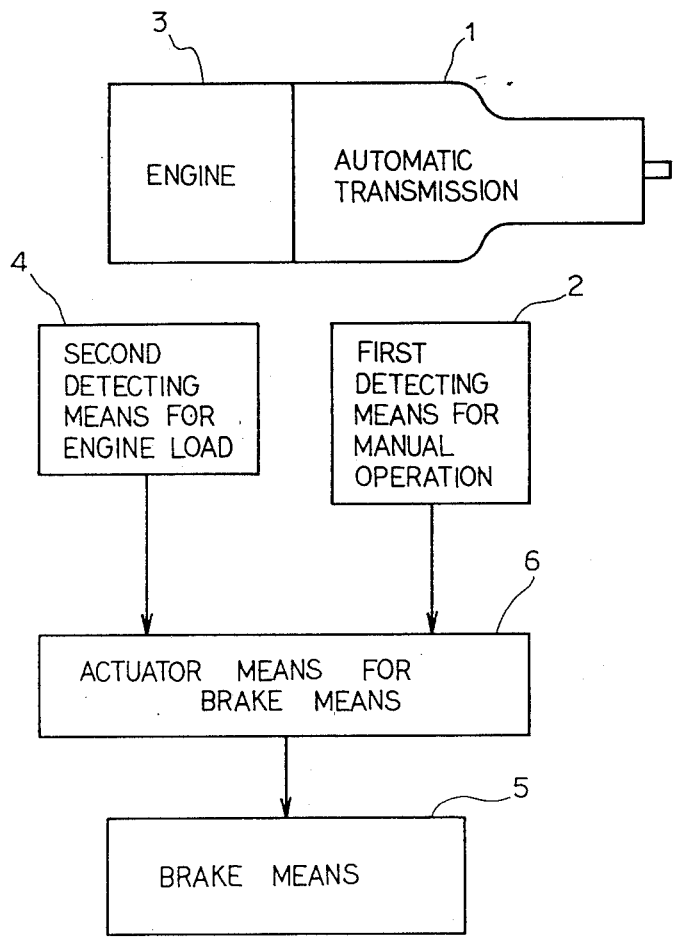
FIG. 2 is a block diagram of an apparatus for controlling braking force according to the present invention.

Referring to FIG. 2, an apparatus for controlling a brake means 5 (e.g., a foot brake) includes a first detecting means 2 for detecting manual operation of an automatic transmission 1, a second detecting means 4 for detecting load on an engine 3 and an actuator means 6 for actuating the brake means 5.

The first detecting means 2 outputs an operation signal when a shifting means (e.g., an over drive button, a shift lever or a pattern select switch) of the automatic transmission 1 is manually operated. The second detecting means 4 outputs an engine load signal in accordance with the load on the engine 3. The actuator means 6 actuates the brake means 5 when the engine load is less than a predetermined load and the shifting means is manually operated.

The manual operations of the shifting means include "over drive button operation" and "shift lever operation". "Over drive button operation" means that the over drive button is displaced from an indication of an over drive condition to an indication of a normal drive condition. "Shift lever operation" means that the shift lever is displaced from a high speed range to a low speed range.

A throttle opening sensor or an intake pressure sensor is used as the second detecting means for detecting the engine load.

When the shifting means is manually operated and the engine load is less than the predetermined load, the actuator means 6 actuates the brake means 5 during an initial converting time period in accordance with peak value of negative engine torque.

The initial converting time period is initiated after the start of converting drive position, and defined between the start of converting drive position the start of actuating of the engine brake function. The negative engine torque reaches of a peak value during converting drive position and the peak value is determined in accordance with kind of the converting drive position and vehicle speed.

When the shift means is manually operated and the engine load is less than the predetermined load, the brake means 5 is actuated during the initial converting time period in accordance with the outputs of the first manual operation detecting means 2 and the second engine load detecting means 4. Accordingly, when an operator operates the shift means to actuate the engine brake function and the automatic transmission 1 is positioned at the neutral position, the brake means 5 is actuated. As a result, the vehicle is braked during the manual operation of the shift means.

Therefore, when the shift means is manually operated and the engine load is less than the predetermined load, the brake means 5 is actuated during the initial converting time period. As a result, when the automatic transmisson 1 is manually operated the brake means 5 or the engine brake function is actuated. In other words, the brake means 5 is actuated and the vehicle is braked as soon as the shift means is manually operated to obtain the engine brake function.

Thus, when the automatic transmission 1 is positioned in the neutral condition the brake means 5 is actuated and the engine brake function is not suddenly actuated. As a result, the change of the brake force is small.

Accordingly, when the shift means is manually operated in the condition that the vehicle drives down a steep hill, the vehicle is not accelerated and the vehicle is controlled smoothly by the braking force.

Figure 3:
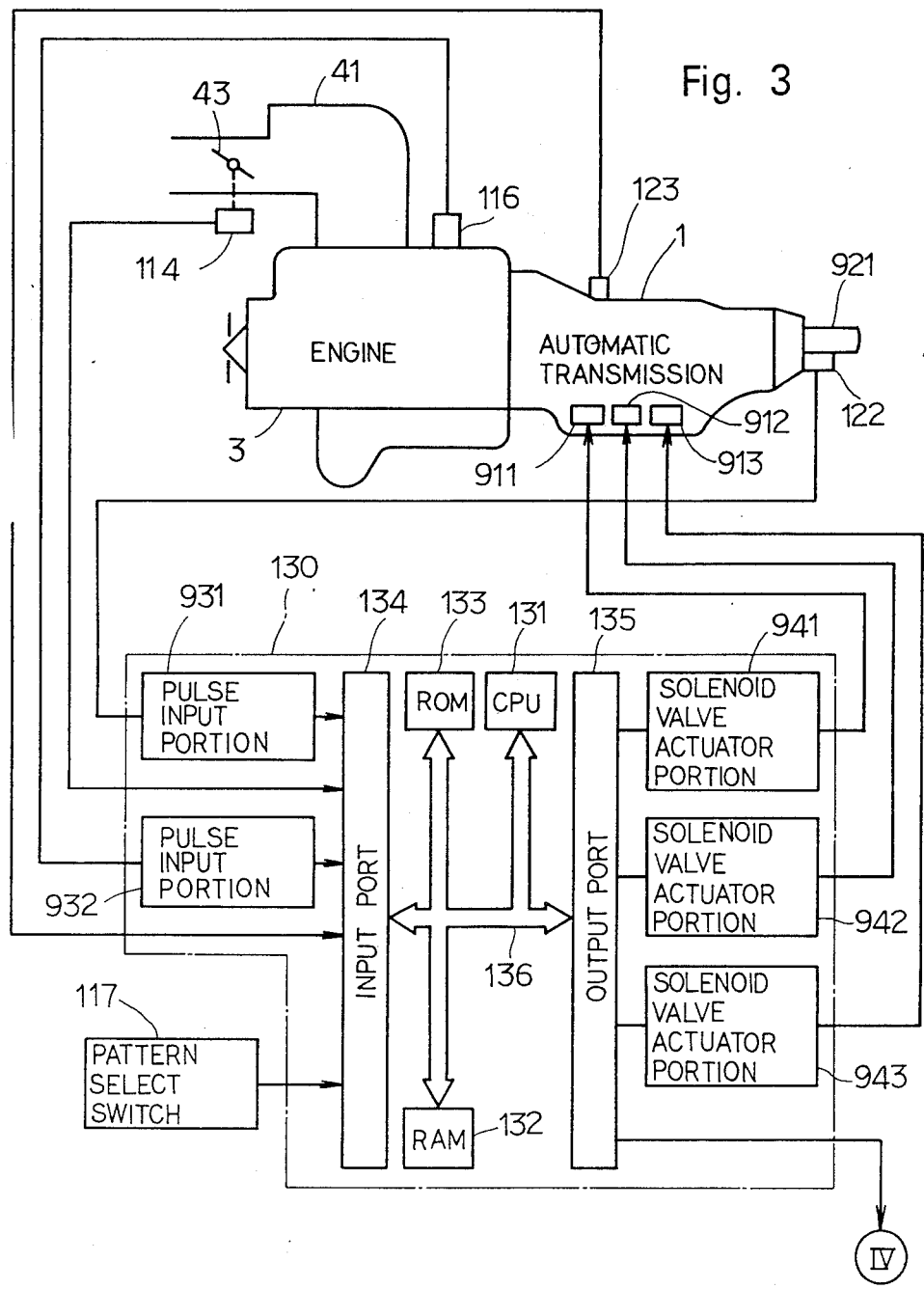
FIG. 3 is a block diagram illustrating a first control circuit of the apparatus of the present invention.
Figure 4:
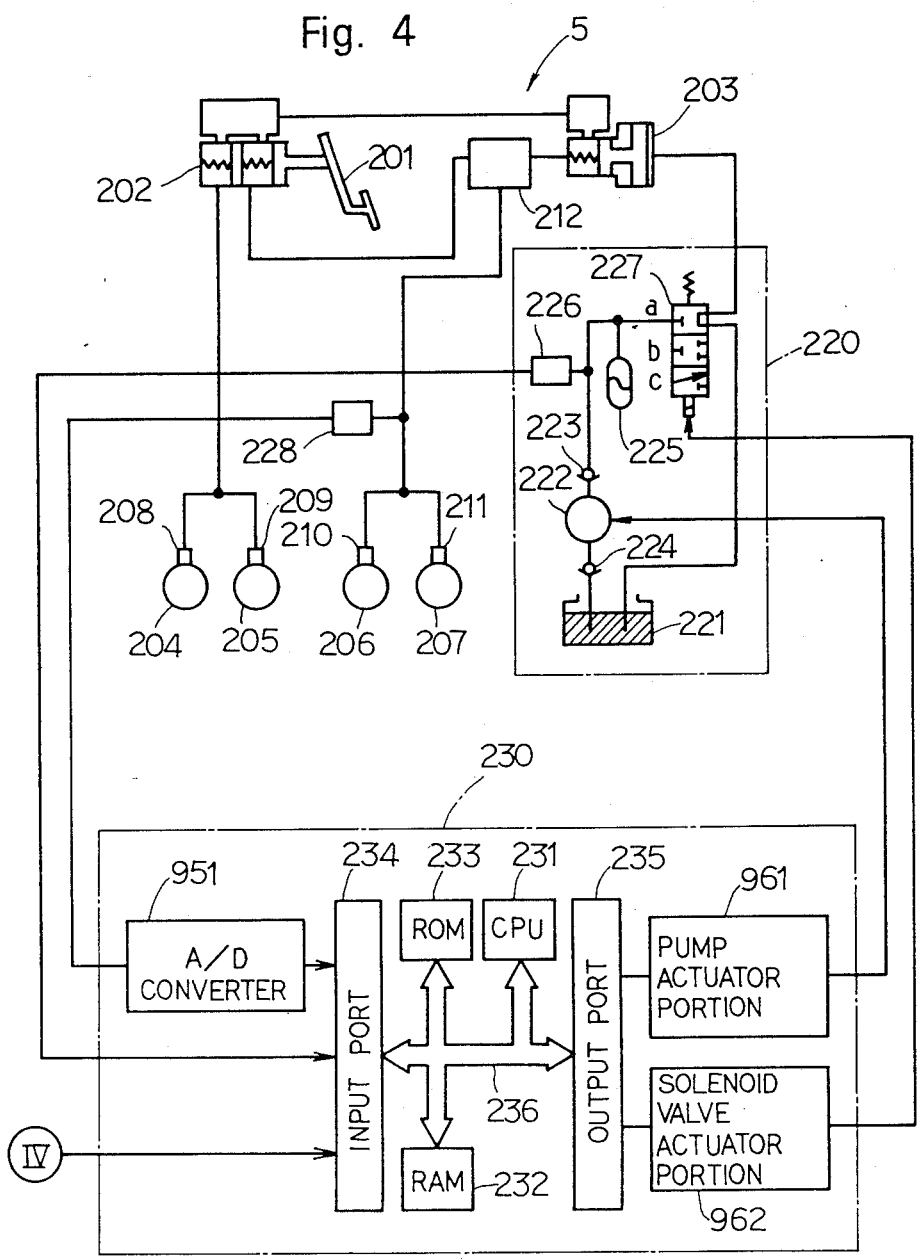
FIG. 4 is a block diagram illustrating a second control circuit and a brake means of the apparatus of the present invention.

FIGS. 3 and 4 show a block diagram illustrating an embodiment of the present invention. The automatic transmission 1 can convert a drive position into one of the other drive positions by controlling hydraulic pressure. The hydraulic pressure is controlled by actuating of first through third solenoid valves 911 through 913. The first through third solenoid valves 911 through 913 are controlled by output signals from a first control circuit 130. The first control circuit 130 receives signals outputted from sensors or switches mounted on the engine 3 and the transmission 1. A throttle opening sensor 114 detects the amount of opening of a throttle valve 43 which is mounted into an intake manifold 41. An engine revolution sensor 116 detects the number of revolutions of the engine 3. A vehicle speed sensor 122 detects the number of revolutions of an output shaft 921 of the automatic transmission 1. A shift position sensor 123 detects one of the shift positions of the automatic transmission 1. The pattern select switch 117 indicates one of the converting drive position patterns (i.e., the over drive condition or the normal drive condition).

As shown in FIG. 3, the first control circuit 130 includes a central processing unit "CPU" 131, a random access memory 132, a read only memory 133, an input port 134, an output port 135 and a common bus 136. The input port 134 receives output signals from the vehicle speed sensor 122 and the engine revolution sensor 116 through pulse input portions 931 and 932 respectively. Further, the input port 134 also receives output signals directly from the throttle opening sensor 114, the shift position sensor 123 and the pattern select switch 117. The output port 135 outputs signals to the first through third solenoid valves 911, 912 and 913 through the solenoid valve actuator portions 941, 942 and 943. Further, the output port 135 outputs a brake control signal to an input port 234 of a second control circuit 230 shown in FIG. 4. The brake control signal is outputted through a brake control signal line which consists of three lead wires. The brake control signal line transmits a zero level signal through a seventh level signal. When the zero line signal is transmitted the brake means 5 is not actuated. On the other hand, the seventh level signal is transmitted the brake means 5 output maximum braking force.

The ROM 133 stores the table shown in FIG. 6, and flow charts for controlling the converting drive position of the automatic transmission 1.

The first control circuit 130 controls shift up or shift down of the automatic transmission 1 in accordance with the signals from the sensors 114, 116, 122 and 123 and the switch 117.

The brake means 5 brakes the vehicle in accordance with output signals from the second control circuit 230 which receives the brake control signal from the first control circuit 130.

The brake means 5 includes a brake pedal 201, a brake master cylinder 202, a sub master cylinder 203, wheel cylinders 208 through 211 of free wheels 204 and 205 and driving wheels 206 and 207. The master cylinder 202 generates brake pressure in accordance with the amount of displacement of the brake pedal 201. The sub master cylinder 203 generates brake pressure during the manual operation of the automatic transmission for actuating the engine brake function. Since the brake master cylinder 202 is of a tandem brake master cylinder, the brake pressure is transmitted to the free wheels 204 and 205 through a first hydraulic line and to the driving wheels 206 and 207 through a seocnd hydraulic line which is not connected to the first hydraulic line. The sub master cylinder 203 generates sub hydraulic pressure for controlling the driving wheels 206 and 207 and the sub hydraulic pressure is transmitted to the wheel cylinders 210 and 211. Further a change valve 212 is connected to the brake master cylinder 202 and the wheel cylinders 210 and 211. The change valve 212 is a shuttle type valve. The wheel cylinders 210 and 211 receive either the higher hydraulic pressure of the hydraulic pressure generated by the brake master cylinder 202 or the sub hydraulic pressure generated by the sub master cylinder 203.

A sub master hydraulic line 220 is of a hydraulic line for brake pressure generated by the sub master cylinder 203. The sub master hydraulic line 220 includes a reservoir tank 221, a hydraulic pump 222, one way valves 223 and 224, an accumulator 225, a hydraulic pressure switch 226 and a three position valve 227. The hydraulic pump 222 pumps oil from the reservoir tank 221. The one way valves 223 and 224 prevent oil from draining into the reservoir tank 221. The accumulator 225 reserves the oil in a high pressure condition so that the oil may be used as an energy source for actuating the sub master cylinder 203. The hydraulic pressure switch 226 is turned on when the hydraulic pressure, transmitted from the hydraulic pump 222 to the accumulator 225, is less than a predetermined pressure. The three position valve 227 directs the pressured oil from the accumulator 225 to the sub master cylinder 203 when the automatic transmission 1 is manually operated to actuate the engine brake function. The three position valve 227 is a solenoid operation valve, the three position valve 227 is positioned at a drain position "a" by a spring in the normal condition. The three position valve 227 may be selectively positioned at either a non-communication position "b" or a pressure up position "c" in accordance with receipt of one of actuating signals.

The hydraulic pump 222 and the three position valve 227 are actuated by signals from the second control circuit 230. The second control circuit 230 receives the brake control signal from the first control circuit 130 of the automatic transmission 1, and signals outputted from the hydraulic pressure switch 226 and the hydraulic pressure sensor 228 which detects the hydraulic pressure of the wheel cylinders 210 and 211.

The second control circuit 230 includes a CPU 231, a RAM 232, a ROM 233, an input port 234, an output port 235 and a common bus 236, The input port 234 receives a signal from the hydraulic pressure sensor 228 through an A/D converter 951 and a signal directly from the hydraulic pressure switch 226. The output port 235 outputs a signal to a pump actuator portion 961 and a solenoid valve actuator portion 962. The ROM 233 stores flow charts for controlling the brake means 5, shown in FIGS. 9, 10 and 11.

The second control circuit 230 receives signals and controls the brake means 5.

Figure 5:
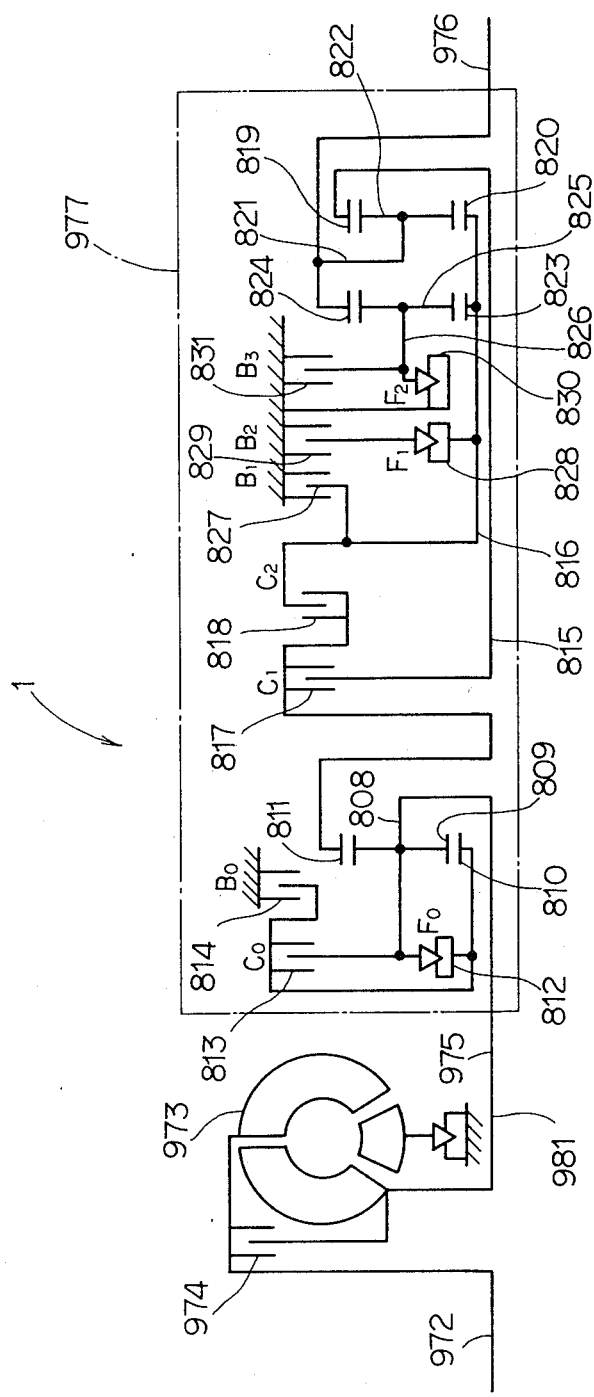
FIG. 5 is a schematic structure of an automatic transmission.

FIG. 5 shows a schematic structure of the automatic transmission 1. The automatic transmission 1 includes an input shaft 972, a hydraulic type torque converter 973, a lock up clutch 974, an output shaft 981 of the torque converter 973, an output shaft 976 and a gear mechanism 977. The input shaft 972 is connected to an output shaft of the engine 3. The lock up clutch 974 transmits torque from the input shaft 972 to the output shaft 981 of the torque converter 973 when the lock up clutch 974 bypasses the torque converter 973, and the lock up clutch 974 directly connects the input shaft 972 to output shaft 981. The gear mechanism 977 includes an input shaft 975 which is connected to the output shaft 981 of the torque converter 973 and the gear mechanism 977 includes the output shaft 976 which drives the driving wheels 206 and 207.

The gear mechanism 977 includes an over drive mechanism which includes the input shaft 975, a carrier 808, planet pinions 809, a sun gear 810, a ring gear 811, a one way clutch "Fo" 812, a clutch "Co" 813 and a brake "Bo" 814. The carrier 808 is connected to the input shaft 975. The planet pinions 809 are carried by the carrier 808. The sun gear 810 engages the planet pinions 809. The one way clutch "Fo" 812 is located between the ring gear 811, the carrier 808 and the sun gear 810. The clutch "Co" 813 engages the selectively with one of the carrier 808 and the sun gear 810. The brake "Bo" 814 locks selectively the sun gear 810 to a housing.

Further, the gear mechanism 977 includes an intermediate shaft 815, a clutch "C1" 817, a clutch "C2" 818, a ring gear 819, a sun gear shaft 816, a sun gear 820, a carrier 821, planet pinions 822, a sun gear 823, a ring gear 824, planet pinions 825, carrier 826, a brake "B1" 827, a one way clutch "F1" 828, a brake "B2" 829, a one way clutch "F2" 830 and a brake "B3" 831. The clutch "C1" 817 and the clutch "C2" 818 connect selectively one of the intermediate shaft 815 and the sun gear shaft 816 to the ring gear 811. The ring gear 819 is connected to the intermediate shaft 815. The sun gear 820 is connected to the sun gear shaft 816. The planet pinions 822 engage both of the ring gear 819 and the sun gear 820, and are carried by the carrier 821 which is connected to the output shaft 976. The sun gear 823 is connected to the sun gear shaft 816. The ring gear 24 is connected to the output shaft 976. The planet pinions 825 engage both the sun gear 823 and the ring gear 824. The carrier 826 carries the planet pinions 825. The brake "B1" 827 locks selectively the sun gear shaft 816 to the housing. The brake "B2" 829 locks selectively the sun gear shaft 816 in the housing through the one way clutch "F1" 828. The one-way clutch "F2" 830 locks the carrier 826 to the housing when the carrier 826 rotates in one direction.

The brake "B3" 831 locks selectively the carrier 826 to the housing. Accordingly, the gear mechanism 977 functions as an apparatus for converting or changing drive positions including three forward drive positions and one rearward drive position.

The solenoid valves 911 through 913 supply or drain the hydraulic pressure to or from the lock up clutch 974 of the automatic transmission 1, the clutches and the brakes of the gear mechanism 977. As a result, the lock up clutch 974 selectively engages or disengages and the gear mechanism 977 selects one drive position among the four forward drive positions including the over drive position and one rearward drive position.

FIG. 6 is a table showing the relationships between shift range positions including changed or converted drive positions, the solenoid valves, the clutches and the brakes.

As shown in the note of FIG. 6, "O" represents an actuated condition "ON" of the solenoid valves and an engagement condition of the clutches and the brakes. "X" represents a non-acutuated condition "OFF" of the solenoid valves and a disengagement condition of the clutches and the brakes. "⊙" indicates the solenoid valves are actuated when the lock up clutch 974 is in a lock up condition "L/C ON".

Further, "D" represents a drive range. "2" represents a second range. "L" represents a low range. "R" represents a rearward drive range. "P" represents a parking range. "N" represents a neutral range. "1st" represents a first drive position. "2nd" represents a second drive position. "3rd" represents a third drive position. "4th" represents a fourth drive position, FIGS. 7-A through 7-D show timing charts of the apparatus according to the present invention. The apparatus can brake the vehicle by actuating the brake means when the automatic transmission 1 is manually operated to actuate the engine brake function.

Figure 7:
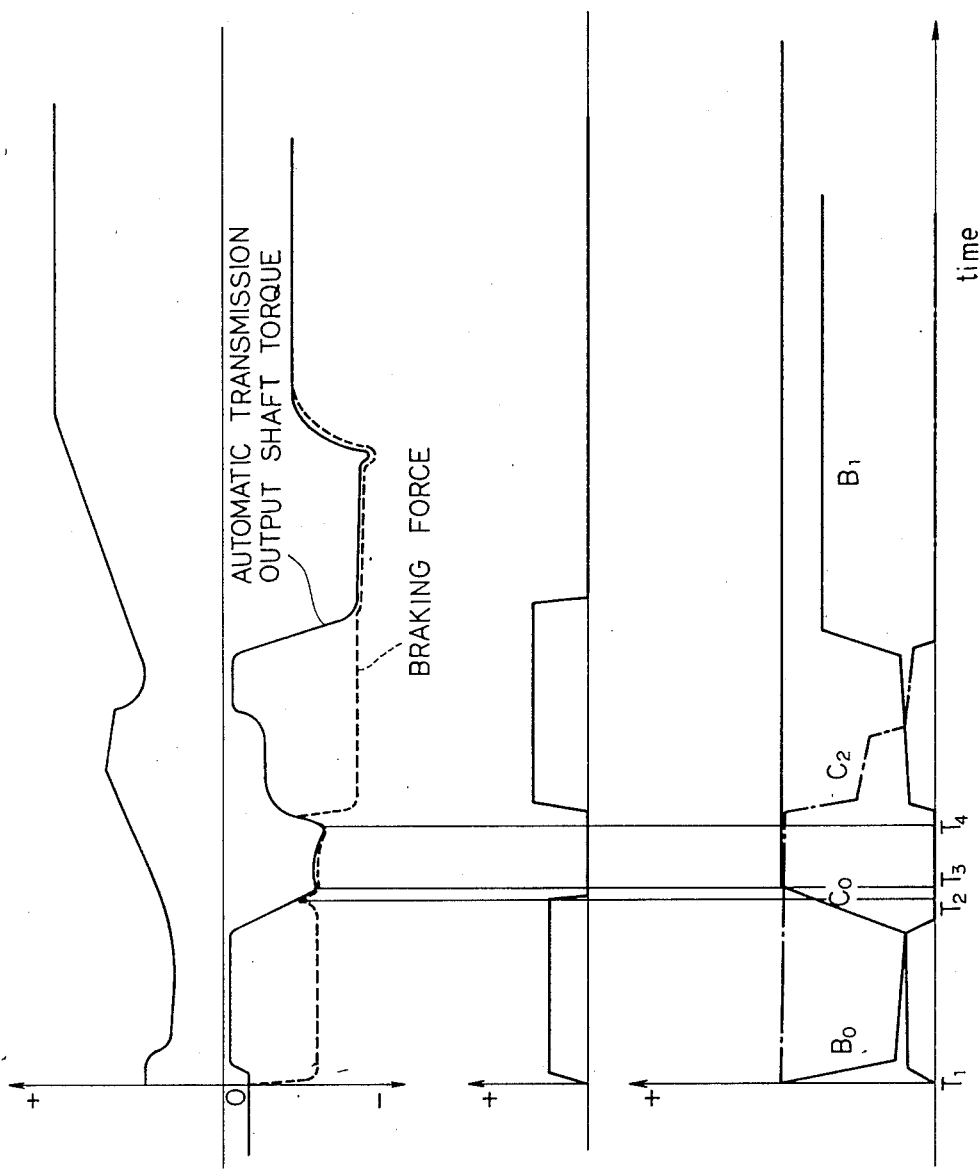
FIG. 7-A is a timing chart of engine revolution number of the apparatus according to the present invention.

FIGS. 7-A through 7-B show converting conditions from the fourth drive position "4th" of the drive range "D" into the second drive position "2nd" of the second range "2". FIG. 7-A shows the relationship between the number of engine revolutions and time. FIG. 7-B shows the relationship between automatic transmission output shaft torque, braking force and time. FIG. 7-C shows a relationship between the actuating force on a foot brake and time. FIG. 7-D shows the relationship between automatic transmission hydraulic pressure and time.

When the automatic transmission output shaft torque is changed from the fourth drive position of the drive range "D" to the second drive position of the second drive range "2" through the temporal third drive position, the vehicle drives without any braking force in the neutral condition of the automatic transmission 1. The apparatus according to the present invention prevents the vehicle from driving without any braking force by actuating of the brake means 5. First, the apparatus actuates the brake means 5 during a time period between "T1" and "T2" shown in FIG. 7-D. A shift from the fourth drive position "4th" of the drive range "D" to the temporal third drive position is indicated at "T1". Negative torque of the automatic transmission output shaft becomes great enough to actuate the engine brake function at "T2".

Figure 8:
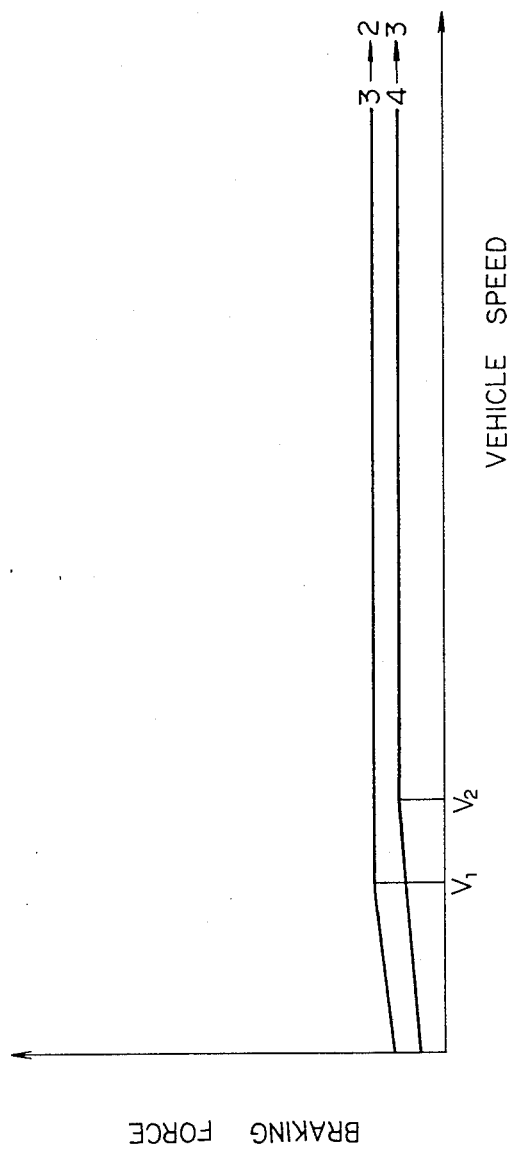
FIG. 8 is a graph showing the relationship between braking force and vehicle speed according to the present invention.

Then, the braking force of the brake means 5 is congruent with the braking force of the negative torque generated by an engagement of the clutch "Co" during a time period between "T3" and "T4". FIG. 8 shows the braking force of the generated negative torque during the time period between "T3" and "T4". As shown in FIG. 8, the braking force is different in accordance with kind of converting drive position, (e.g., the braking force on a converting drive position from the third drive position to the second drive position is greater than the braking force on a converting drive position from the fourth drive position to the third drive position). The braking force is increased up to a vehicle speed "V1" on the converting drive position from the third drive position to the second drive position or up to a vehicle speed "V2" on the converting drive position from the fourth drive position to the third drive position. When the vehicle speed is greater than "V1" or "V2", the braking force is constant. The negative torque of the automatic transmission output shaft is generated when the brake of the automatic transmission 1 engages during an inertia phase on the manual operation (i.e., a variation period of revolution speed of an automatic transmission member). The maximum value of the negative torque is determined by torque capacity of the brake means defined by supplied hydraulic pressure. Accordingly, when the vehicle speed is greater than "V1" or "V2", the hydraulic pressure supplied to the brake of the automatic transmission 1 is saturated, as a result, the negative torque of the automatic transmission output shaft becomes constant.

On the other hand, when the vehicle speed is less than "V1" or "V2", engagement of the brake is finished while the hydraulic pressure of the brake the of automatic transmission 1 is increased. As a result, the negative torque of the automatic transmission output shaft corresponds with the engagement hydraulic pressure.

As mentioned above, the apparatus actuates the brake means 5 during the converting of drive position from the fourth drive position "4th" of the drive range "D" to the temporal third drive position "3rd" or during the converting drive position from the temporal third drive position "3rd" or during the converting of drive position from the temporal third drive to the second drive position "2nd" of the second range "2". As a result, the braking force shown by a phantom line in FIG. 7-B is obtained. Accordingly, the apparatus compensates or adjusts the braking force before actuating of the engine brake function on the manual operation.

Figure 9:
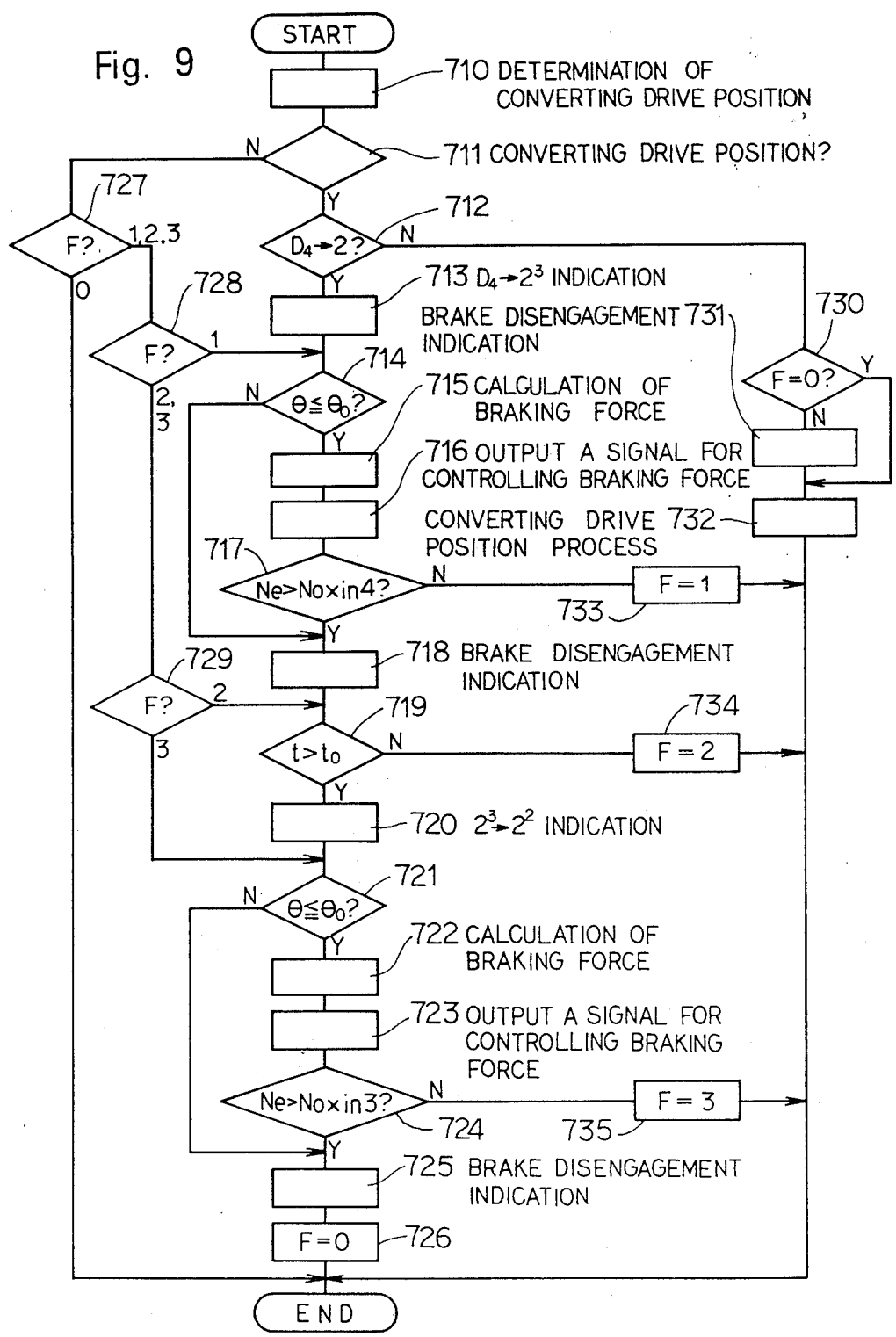
FIG. 9 is a flow chart showing a controlling method of the apparatus according to the present invention.

A method of controlling method of the apparatus according to the present invention is disclosed hereinafter in accordance with FIGS. 9 through 11, wherein FIG. 9 shows the method of controlling the converting of drive position from the fourth drive position "4th" of the drive range "D" to the second drive position "2nd" of the second range "2". It is apparent that a similar controlling method can be used in a different change of drive position.

A step 710 determines changes in drive position (i.e., converting drive position) in accordance with the vehicle speed, engine load (i.e., the throttle opening) and a shift position. A step 711 determines whether drive position of the automatic transmission is converting. When the step 711 determines that the drive position is converting, a step 712 is processed. The step 712 determines whether the fourth drive position "4th" of the drive range "D" is converting into the second drive position "2nd" of the second range "2". When the step 712 determines so, a step 713 is processed. The stpe 713 indicates the converting drive position from the fourth drive position "4th" of the drive range "D" (i.e., "D4") into the temporal third drive position (i.e., "$2^3$"). The "$2^3$" is temporarily achieved before an achievement of the second drive position of the second range "2" (i.e., "$2^2$"). After the step 713, a step 714 determines whether the throttle opening is closed less than a predetermined opening "$\theta_o$" (i.e., $\theta=\theta_o$). When the throttle opening is closed less than a predetermined opening "$\theta_o$", the braking force of the brake means 5 of the vehicle is calculated at a step 715. When the throttle opening is closed less than the predetermined opening "$\theta_o$", the controlling method determines that the manual operation from "D4" to "$2^2$" is of the manual operation requiring the engine brake function, as a result, the brake means 5 of the vehicle should be actuated. The braking force of the vehicle is calculated in accordance with one of two kinds of the converting drive positions shown in FIG. 8 (i.e., converting drive positions from the fourth drive position into the third drive position, or the converting drive position from the third drive position into the second drive position) and the vehicle speed (i.e., the number of automatic transmission output shaft revolutions). After the step 715, a step 716 is processed, wherein the brake means 5 are actuated until the engine brake function is actuated. After the step 716, a step 717 determines whether the number of engine revolutions "Ne" is greater than the number of turbine revolutions "No×in 4" (i.e., an initial condition of the actuating of the brake of the automatic transmission 1). "No" represents the automatic transmission output shaft revolution number, and "in 4" represents the gear ratio of the fourth drive position "4th" of the automatic transmission 1 (i.e., number of input revolutions/number of output revolutions). Before the engine brake function is actuated the number of engine revolutions is less than the number of turbine revolutions (i.e., Ne<No×in 4). After the engine brake function is acuated, the number of engine revolutions is greater than the number of turbine revolutions (i.e., Ne>No×in 4).

Accordingly, when the step 717 determines the "Ne>No×in 4", a step 718 indicates a brake disengagement indication. As a result, the brake means 5 of the vehicle is not actuated.

On the other hand, when the step 71 determines that "Ne<No×in 4", a step 733 is processed and sets a flag "F=1". As a result, steps 727 through 729 are processed.

When the step 714 determines that the throttle opening is not closed less than the predetermined opening "$\theta$o", the step 718 is processed. As a result, the step 718 indicates brake disengagement.

Accordingly, the fourth drive position "4th" of the drive range "D" of the automatic transmission 1 is converted into the temporal third drive position and the brake means 5 is actuated during the converting drive position defined between the step 713 and the step 718.

Next, the temporal third drive position is converted into the second drive position "2nd" of the second range "2" and the brake means 5 is actuated during the converting drive position defined between a step 719 through the step 725. After the step 718, the step 719 determines whether the converting drive position "D4→$2^3$" is finished (i.e., whether a predetermined time period "to" has run after the time of the indication of the converting drive position "D4→$2^3$"). When the step 719 determines that the predetermined time period "to" has run (i.e., t>to) a step 720 indicates a converting drive position "$2^3$→$2^2$", wherein "$2^2$×" represents the second drive position "2nd" of the second range "2". Unless the step 719 determines that t>to, a step 734 sets a flag "F=2" and the steps 727 through 729 are processed.

In a similar manner to the converting drive position "D4→$2^3$", a step 721 determines whether the throttle opening is closed less than or equal to the predetermined opening "$\theta$o". When the step 721 determines that the throttle opening is closed less than or equal to the predetermined opening "$\theta$o" (i.e., $\theta\leq\theta$o), a step 722 calculates the braking force and a step 723 outputs a signal to the second control circuit 230. After the step 723, a step 724 determines an initial condition of the actuating of the engine brake function and a step 725 indicates a disengagement of the brake means 5 of the vehicle. A formula "Ne>No×in 3" is used for determing the intial condition of the actuating of the engine brake function at the step 724, wherein "in 3" represents the gear ratio of the third drive position. The step 725 indicates the disengagement of the brake means 5 at the initial condition of the actuating of the engine brake function. Unless the step 724 determines "Ne>No×in 3" a step 735 sets a flag "F=3". As a result, the steps 727 through 729 are processed. After the indication of disengagement of the brake means 5, a step 726 clears the flags (i.e., F=0).

When the step 711 determines no converting drive position in accordance with the result of the determination of the step 710, the steps 727 through 729 are processed.

When the flag is cleared, the step 727 terminates a process shown in FIG. 9.

On the other hand, when the flag 1, 2 or 3 is set, either step 728 or step 729 is processed in accordance with the value of the flag. When the flag "F=1" is set the step 714 is processed in a manner similar to when the step 717 determines "NO" and the step 733 sets the flag "F=1". When the flag "F=2" is set the step 719 is processed a manner similar to when the step 719 determines "NO" and the step 734 sets the flag "F=2". When the flag "F=3" is set the step 721 is processed in a manner similar to when the step 724 determines "NO" and the step 735 sets the flag "F=3".

When the step 712 determines "NO" (i.e., the step 710 determines that there is the converting drive position and that the converting drive position is not of that from the fourth drive position "4th" of the drive range "D" into the second drive position "2nd" of the second range "2"), a step 730 determines whether the flag is cleared (i.e., F=0). As a result, when the flag is set (i.e., the brake means 5 engages), a step 731 indicates the disengagement of the brake means 5 of the vehicle. Then a step 732 conducts a converting drive position process in accordance with the determination of the converting drive position of the step 710.

The brake means 5 is disengaged in accordance with the disengagement indication of the brake means 5 of the step 731, when the different converting drive position is determined at the step 710.

Figure 10:
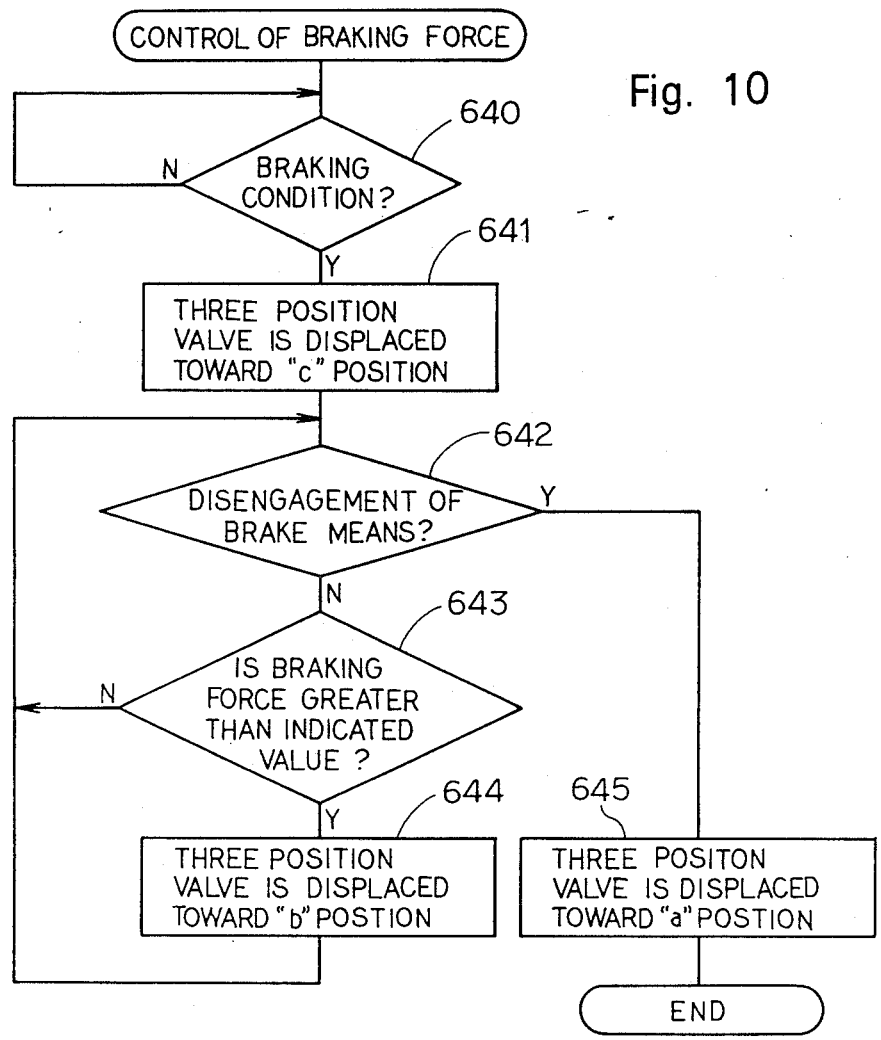
FIG. 10 is a flow chart showing a routine for controlling braking force of the apparatus according to the present invention.

FIG. 10 shows a flow chart for controlling the braking force. The brake means 5 of the vehicle is actuated in accordance with the flow chart shown in FIG. 10 when step 716 or step 723 outputs the signal. The flow chart shown in FIG. 10 controls the hydraulic pressure on the wheel cylinders 210 and 211 of the driving wheels 206 and 207, and controls the braking force supplied to the driving wheels 206 and 207.

A step 640 determines whether the first control circuit 130 of the automatic transmission 1 outputs the signal to indicate the actuation of the brake mean 5. When the first control circuit 130 outputs the signal the step 641 displaces the three position valve 227 toward the "c" position, as a result, hydraulic pressure is suppllied to the wheel cylinder 210 and 211. After the step 641, a step 642 determines whether the step 718 or 725 indicates the disengagement of the brake means 5. When the step 642 determines that disengagement of the brake means 5 is not required, a step 643 determines whether the braking force supplied to the brake means 5 is greater than braking force indicated by the first control circuit 130. When the braking force supplied to the brake means 5 is equal to or greater than the braking force indicated by the first control circuit 130, a step 644 displaces the three position valve 227 toward the "b" position, as a result, the braking force is maintained.

On the other hand, when the step 642 determines that disengagement of the brake means 5 is required, a step 645 displaces the three position valve 227 toward the "a" position, as a result, the hydraulic pressure supplied to the wheel cylinder 210 and 211 is released.

Accordingly, braking force, indicated by the step 716 or 723 shown in FIG. 7, is supplied to the vehicles in accordance with the flow chart in FIG. 10.

As described above, when the automatic transmission 1 is manually operated to be positioned at the neutral position, the brake means 5 of the vehicle is actuated in accordance with the negative torque of the automatic transmission output shaft during the converting drive position of the automatic transmission 1.

Accordingly, the vehicle is braked in accordance with the actuating of the engine brake function during the manual operation. As a result, when the vehicle drives down a steep hill and the automatic transmission is manually operated to increase the engine brake function, the braking force generated by the brake means 5 is supplied to the vehicle until the converting drive position is finished.

Therefore, the present invention provides an apparatus for controlling the braking force of the brake means 5 in response to the manual operation of the automatic transmission 1.

FIG. 11 shows a flow chart for controlling the hydraulic pressure on the accumulator 225 to keep the hydraulic pressure continuously at a predetermined hydraulic pressure.

A step 550 for detecting whether the hydraulic pressure switch 226 is turned on. When the hydraulic pressure switch 226 is turned on (i.e., the hydraulic pressure is less than the predetermined hydraulic pressure), a step 551 actuates the hydraulic pump 222.

On the other hand, when the hydraulic pressure swtich 226 is turned off (i.e., the hydraulic pressure is equal to or greater than the predetermined hydraulic pressure), a step 552 stops the hydraulic pump 222.

Accordingly, the hydraulic pressure is kept continuously at the predetermined hydraulic pressure in accordance with the flow chart shown in FIG. 11 and supplied to the accumulator 225 during the actuation of the brake means 5.

As described herein, the present invention overcomes the shortcomings of the known art by providing an apparatus for controlling braking force in the condition that an automatic transmission is manually operated.

While the present invention has been described in its preferred embodiments, it is to be understood that the invention is not limited thereto, and may be otherwise embodied within the scope of the following claims.

What is claimed is:

1. An apparatus for controlling brake force during changes in drive position of an automatic transmission mounted on a vehicle, the apparatus comprising:
   a first detecting means for detecting manual operation of the automatic transmission, the first detecting means outputting a first signal during the manual operation of the automatic transmission;
   a second detecting means for detecting load on an engine, the second detecting means outputting a second signal;
   a controlling means receiving the first and second signals and outputting a controlling signal during the manual operation of the automatic transmission when the engine load is less than a predetermined value; and
   a brake means mounted on the vehicle, said brake means being actuated to generate braking force in accordance with receipt of said controlling signal, whereby when the automatic transmission is manually operated and the engine load is less than said predetermined value, the vehicle is braked.

2. The apparatus of claim 1, further comprising a third detecting means for detecting vehicle speed and outputting a third signal, and a fourth detecting means detecting the type of change in drive position of the automatic transmission and outputting a fourth signal.

3. The apparatus of claim 2, wherein said controlling means receives said third and fourth signals, and outputs the controlling signal to said brake means, and said brake means supplies the braking force smoothly to the vehicle in accordance with the controlling signal from said controlling means.

4. The apparatus of claim 1, further comprising:
   a fifth detecting means for detecting the number of revolutions of the engine and outputting a fifth signal, and a sixth detecting means detecting the number of revolutions of the output shaft of the autmatic transmission and outputting a sixth signal.

5. The apparatus of claim 4, wherein said controlling means receives one of said fifth signal and said sixth signal and determines whether said automatic transmission is in a neutral condition in accordance with receipt of said one of said fifth signal and said sixth signal, said controlling means outputting the controlling signal to said brake means when said automatic transmission is in a neutral condition, whereby said brake means is actuated during said neutral condition of said automatic transmission.

6. The apparatus of claim 4, wherein said controlling means receives the fifth and sixth signals and determines whether said automatic transmission is in a neutral condition in accordance with receipt of the fifth and sixth signals, said controlling means outputting the controlling signal to said brake means when said automatic transmission is in the neutral condition, whereby said brake means is actuated during the neutral condition of said automatic transmission.

7. The apparatus of claim 3, further comprising:
   a fifth detecting means for detecting the number of engine revolutions and outputting a fifth signal, and sixth detecting means for detecting the number of revolutions of the output shaft of the automatic transmission and outputting a sixth signal.

8. The apparatus of claim 7, wherein said controlling means receives one of said fifth signal and said sixth signal and determines whether said automatic transmission is in a neutral condition in accordance with receipt of said one of said fifth signal and said sixth signal, said controlling means outputting the controlling signal to said brake means when said automatic transmission is in the neutral condition, whereby said brake means is actuated during the neutral condition of said automatic transmission.

9. The apparatus of claim 7, wherein said controlling means receives the fifth and sixth signals and determines whether said automatic transmission is in a neutral condition in accordance with receipt of the fifth and sixth signals, said controlling means outputting the controlling signal to said brake means when said automatic transmission is in the neutral condition, whereby said brake means is actuated during the neutral condition of said automatic transmission.

10. The apparatus of claim 1, wherein said controlling means further comprises a timer means receiving the first signal, said timer means counting a predetermined time period after said controlling means receives the first signal, said controlling means outputting the controlling signal to said brake means after said predetermined time period, whereby said brake means is actuated the predetermined time period after receipt of the first signal.

11. The apparatus of claim 3, wherein said controlling means further comprises a timer means receiving the first signal, said timer means counting a predetermined time period, said controlling means outputting the controlling signal to said brake means after said predetermined time period, whereby said brake means is actuated the predetermined time period after receipt of the first signal.

12. An apparatus for controlling braking force during changes in drive position of an automatic transmission mounted on a vehicle, the apparatus comprising:
 a first detecting means for detecting manual operation of the automatic transmission, the first detecting means outputting a first signal during the manual operation of the automatic transmission;
 a second detecting means for detecting load on an engine, the second detecting means outputting a second signal;
 a third detecting means for detecting vehicle speed and outputting a third signal;
 a fourth detecting means detecting the type of change in drive position of the automatic transmission and outputting a fourth signal;
 a controlling means receiving said first, second third and fourth signals and including a calculation means for calculating braking force in accordance with said third and fourth signals, said controlling means outputting a controlling signal during manual operation of the automatic transmission when the engine load is less than a predetermined value; and
 a brake means mounted on the vehicle, said brake means being actuated to generate braking force in accordance with receipt of said controlling signal and supplying the braking force to the vehicle in accordance with said controlling signal, whereby when the automatic transmission is manually operated and the engine load is less than the predetermined value, the vehicle is braked in accordance with the braking force calculated by said calculating means.

13. The apparatus of claim 12, further comprising;
 a fifth detecting means detecting the number of engine revolutions and outputting a fifth signal, and a sixth detecting means detecting the number of revolutions of the output shaft of the automatic transmission and outputting a sixth signal.

14. The apparatus of claim 13, wherein said controlling means receives one of said fifth signal and said sixth signal and determines whether said automatic transmission is in a neutral condition in accordance with receipt of said one of said fifth signal and said sixth signal, said controlling means outputting said controlling signal to said brake means when said automatic transmission is in said neutral condition, whereby said brake means is actuated during the neutral condition of said automatic transmission.

15. The apparatus of claim 13, wherein said controlling means receives the fifth and sixth signals and determines whether said automatic transmission is in a neutral condition in accordance with receipt of the fifth and sixth signals, said controlling means outputting the controlling signal to said brake means when said automatic transmission is in the neutral condition, whereby said brake means is actuated during the neutral condition of said automatic transmission.

16. The apparatus of claim 12, wherein said controlling means further comprises a timer means receiving the first signal, said timer means counting a predetermined time period, said controlling means outputting the controlling signal to said brake means after said predetermined time period, whereby said brake means is actuated the predetermined time period after receipt of the first signal.

17. An apparatus for controlling braking force during changes in drive position of an automatic transmission mounted on a vehicle, the apparatus comprising:
 a first detecting means for detecting manual operation of the automatic transmission, the first detecting means outputting a first signal during the manual operation of the automatic transmission;
 a second detecting means for detecting load on an engine, the second detecting means outputting a second signal;
 a third detecting means for detecting vehicle speed and outputting a third signal;
 a fourth detecting means for detecting the type of change in drive position of the automatic transmission and outputting a fourth signal;
 a controlling means receiving the first, second, third and fourth signals, and said controlling means including a calculating means for calculating braking force in accordance with the third and fourth signals and a timer means receiving the first signal, said timer means counting a predetermined time period, said controlling means outputting a controlling signal during the manual operation of the automatic transmission when the engine load is less than a predetermined value, said controlling means outputting the controlling signal again the predetermined time period after receipt of the first signal; and
 a brake means mounted on the vehicle, and receiving said controlling signal, the brake means being actuated to generate braking force in accordance with receipt of the controlling signal and supplying the braking force to the vehicle in accordance with the controlling signal, whereby when the automatic transmission is manually operated and the engine load is less than the predetermined value the vehicle is braked and when the automatic transmission is manually operated and the engine load is less than the predetermined value and the predetermined time period has past, the vehicle is braked.

18. The apparatus of claim 17, further comprising;
a fifth detecting means for detecting the number of engine revolutions and outputting a fifth signal, and a sixth detecting means for detecting the number of revolutions of the output shaft of the automatic transmission and outputting a sixth signal.

19. The apparatus of claim 18, wherein said controlling means receives one of said fifth signal and said sixth signal and determines whether said automatic transmission is in a neutral condition in accordance with receipt of said one of said fifth signal and said sixth signal, said controlling means outputting the controlling signal to said brake means when said automatic transmission is in the neutral condition, whereby said brake means is actuated during the neutral condition of said automatic transmission.

20. The apparatus of claim 18, wherein said controlling means receives the fifth and sixth signals and determines whether said automatic transmission is in a neutral condition in accordance with recipt of the fifth and sixth signals, said controlling means outputting the controlling signal to said brake means when said automatic transmission is in the neutral condition, whereby said brake means is actuated when the neutral condition of said automatic transmission.

* * * * *